United States Patent Office 3,504,919
Patented Apr. 7, 1970

3,504,919
SHAFT SEALS
Geoffrey W. Halliday, Whitley Bay, and Keith Broadbelt, Tynemouth, England, assignors to George Angus & Company Limited, Newcastle upon Tyne, England
Filed June 30, 1967, Ser. No. 650,503
Claims priority, application Great Britain, Oct. 25, 1966, 47,808/66
Int. Cl. F16j 15/32, 15/48
U.S. Cl. 277—134          7 Claims

ABSTRACT OF THE DISCLOSURE

A shaft seal which provides a feed-back of sealing fluid in either direction of relative rotation has a sealing contact band with a zone which is not completely circumferential and a groove or ridge extends around such zone from end to end to form a feed-back vane surface member.

---

Figure 1:
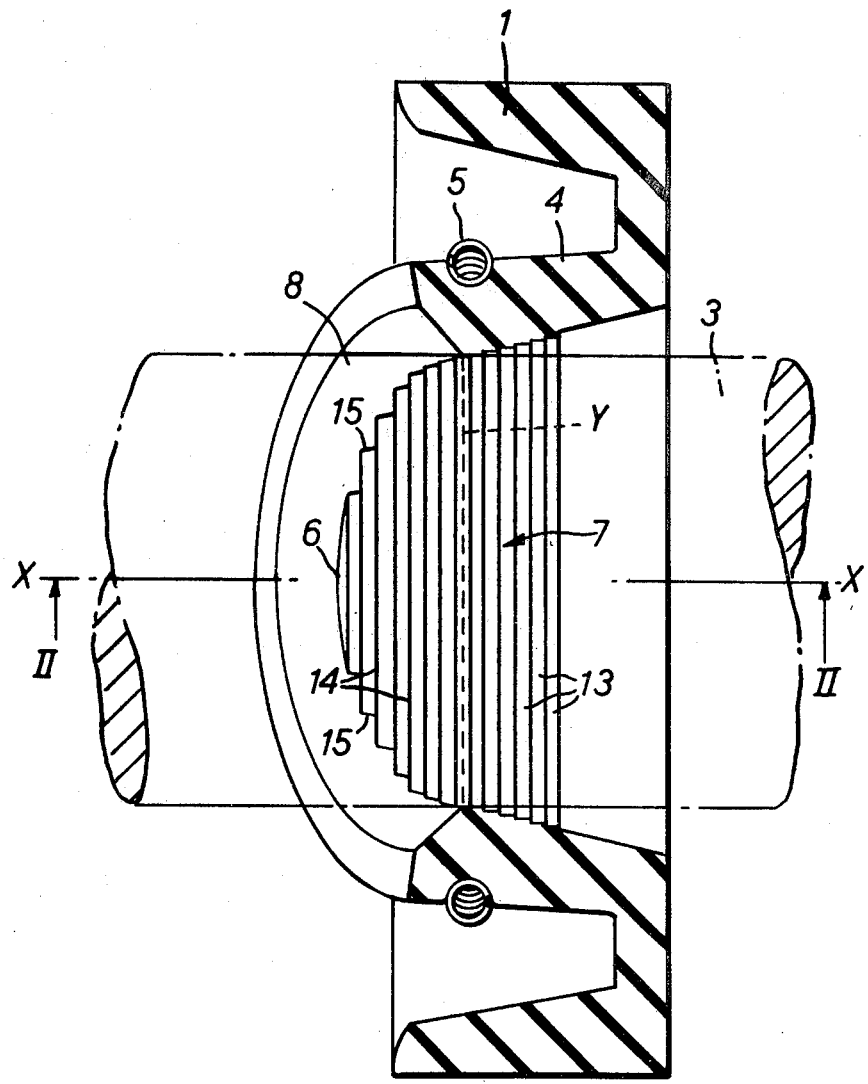

This invention relates to shaft seals, also known as oil seals, designed for sealing against fluid leakage along shafts, such as engine crankshafts or motor vehicle drive-transmission shafts, which are difficult to seal because of such factors as shaft deflection, torsional oscillation and eccentricity in motion.

It has long been known that the sealing of such shafts can be improved by providing at the sealed periphery some form of return feed screw, or feed-back scroll, formed by a helical ridge or groove on the shaft or seal surface. By suitable selection of the direction of the helix in relation to the normal direction of rotation of the shaft, the effect of relative rotation is to feed back oil or other fluid tending to leak past the seal.

The most convenient way of providing a feed-back effect is to form the required ridge or groove on the sealing periphery of the seal so that shaft modification is not required and the seal will operate on the cylindrical surface of any shaft of the appropriate size.

Known feed-back seals will give satisfactory results in one direction of rotation for which they are designed but for reversible shafts, in particular motor vehicle drive or transmission shafts, there is a requirement for a feed-back seal which will serve in either direction of rotation.

The present invention provides feed-back shaft seals designed to provide a feed-back effect in either direction of rotation.

According to the invention, a shaft seal comprises a moulded sealing ring of resilient material forming a sealing annulus with a peripheral surface presenting a sealing band to contact and seal around an opposed cylindrical surface in use, the sealing band having at least one zone which is incompletely circumferential with respect to the cylindrical surface to be sealed, in which said zone has at least one vane surface member which is formed by a ridge or groove in the sealing band and extends around said zone from end to end thereof.

The invention can be applied to lip-type shaft seals which each have a sealing band which includes a part or edge oblique to the seal axis and thus providing an incompletely circumferential zone around the sealed surface.

In a lip-type seal as manufactured, the sealing band is an edge, usually formed by the junction of two frustoconical surfaces or sometimes by the end of one frustoconical surface, but initial wear in use, known as "bedding-in," axially widens the edge to a narrow band, also known as the "contact band." A corresponding band could however be formed in manufacture of a lip-type seal.

The term "vane surface member" has been chosen as a descriptive and generic term for a ridge or groove presenting a surface which, on rotation relatively to a fluid to which it is exposed, will impel the fluid.

The effect of such a vane surface member extending around an incompletely circumferential zone of a sealing band is that, for either direction of relative shaft rotation, one end portion or the other of the vane surface member will impinge relatively obliquely across the path of fluid tending to leak past the sealing band with the result that the fluid is fed back and leakage is prevented or reduced.

Figure 2:
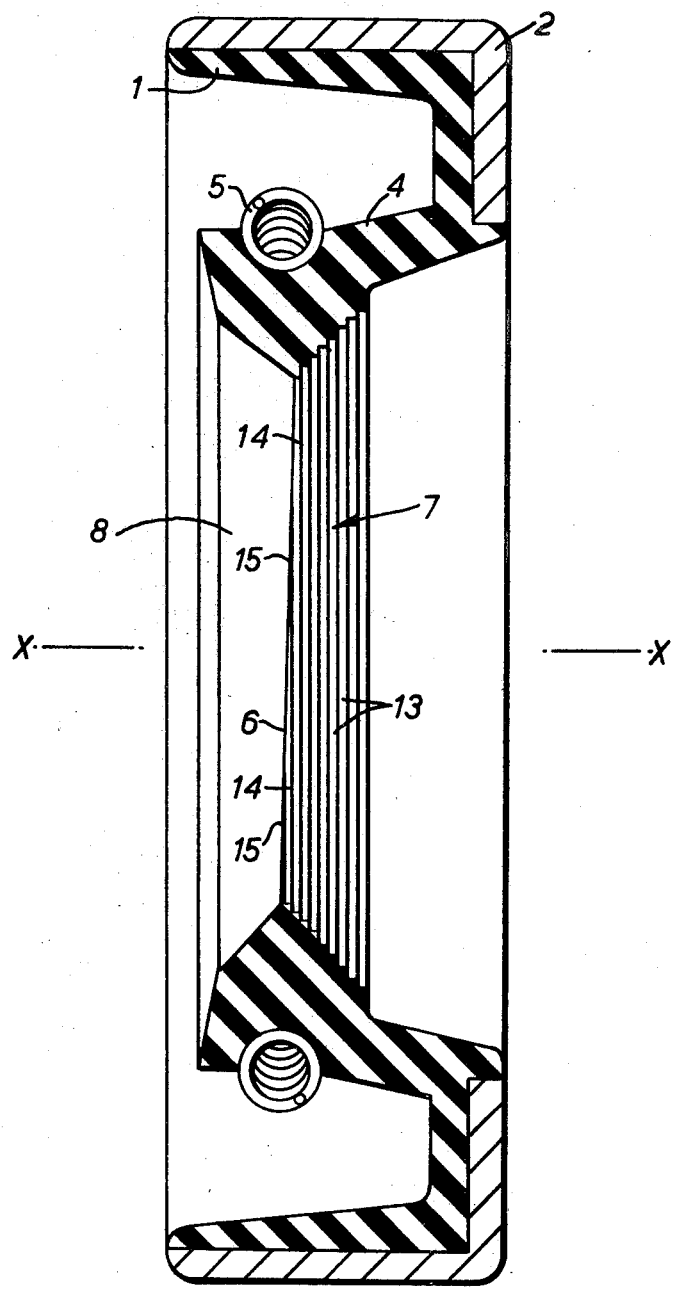
Figure 3:
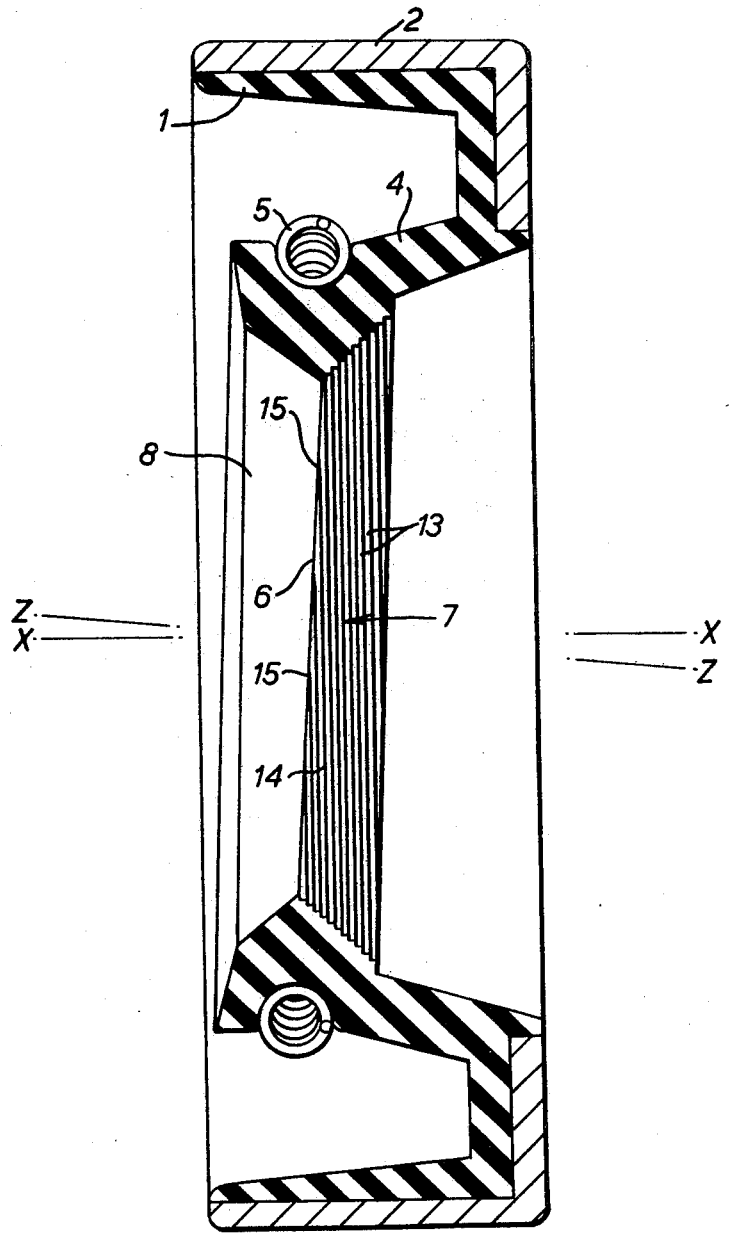
Figure 4:
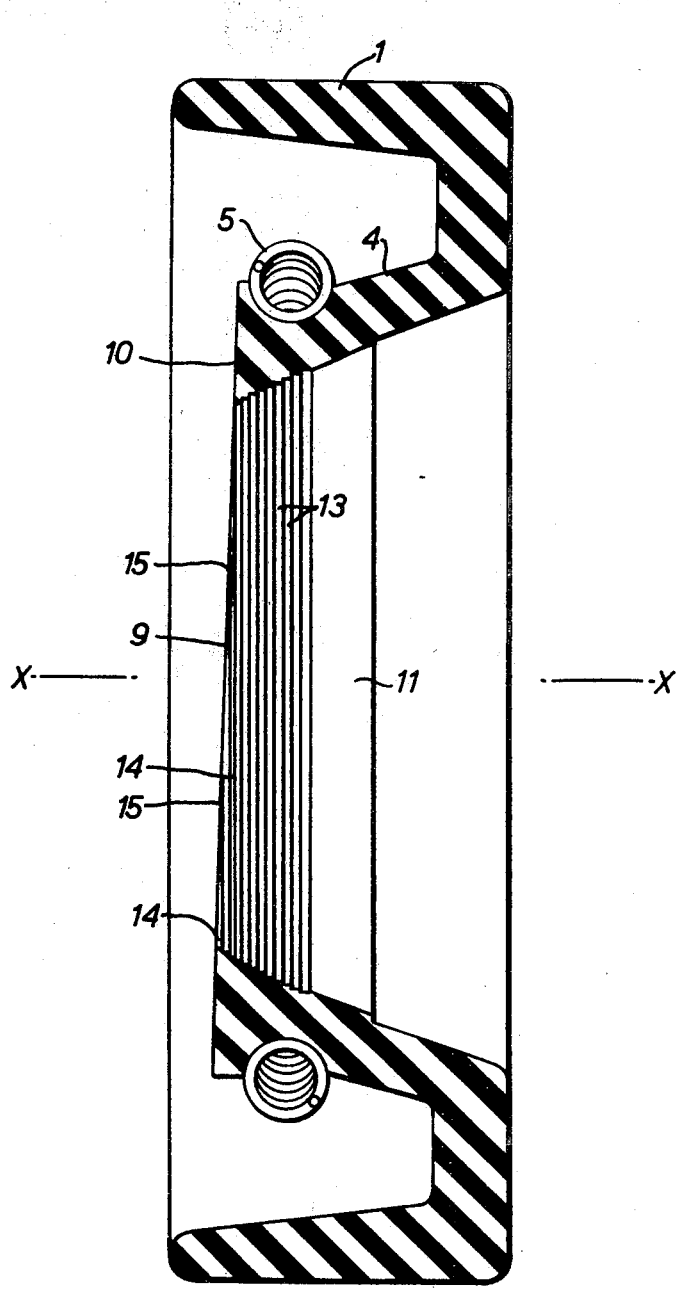

The invention will now be described, by way of example, with reference to the accompanying drawings, in which:

FIG. 1 is a somewhat diagrammatic axial section of a lip-type internal shaft seal with a sealing edge at an exaggerated oblique angle to illustrate the principle of the invention, FIG. 2 is an axial section of a seal corresponding to the seal of FIG. 1 but without the exaggeration and taken at 90° to the section of FIG. 1 as indicated by the arrows II—II on FIG. 1, FIG. 3 is an axial section of a lip-type internal shaft seal with an oblique sealing lip-flange, FIG. 4 is an axial section of a different form of lip-type internal shaft seal with an oblique sealing edge knifed at the free end of the lip-flange.

The seals illustrated each comprise a moulded ring of resilient material, usually oil-resistant synthetic rubber or a like elastomer, and each has a cylindrical holding wall portion 1, which may be stiffened by a metal ring insert 2, for mounting as a press fit in a housing to seal around a shaft extending therethrough. A shaft 3 is indicated in broken lines in FIG. 1.

The seals of FIGS. 1 to 4 are lip-type seals having a flexible lip-flange 4 embraced by a garter spring 5 to constrict the lip resiliently around the shaft. Such garter springs are commonly used but are not absolutely essential and other types of springs, such as finger springs, are known.

In FIGS. 1 to 3, the inside peripheral surface of the flange 4 has a sealing edge 6 formed by the junction of a moulded frustoconical outer surface 7, which tapers to the sealing edge and is referred to as the outer surface because it faces away from the sealed fluid in use, and an oppositely-facing inner frustoconical surface 8 which is cut, by an operation known as "knifing," on the flange 4 after moulding.

The seal of FIG. 4 has a sealing edge 9 formed at the free end of the flange 4 by a knifed plane inner surface 10 intersecting a moulded frustoconical outer surface 11 tapering to the sealing edge.

When lip seals, such as are shown by FIGS. 1 to 4, are in use, the sealing edge deforms against the shaft surface and widens slightly, as mentioned above, to form a sealing band of contact around the shaft.

As so far described, the seals illustrated are in accordance with known shaft seals.

The improvement provided by the present invention is illustrated, in much exaggerated form, by FIG. 1.

In the frustoconical outer surface 7 are moulded right circular grooves 13 which are coaxial with the axis X—X of the seal and shaft 3.

The frustoconical inner surface 8 is cut obliquely to the axis X—X so that the sealing edge 6 is elliptical, lying in a plane which is transversely oblique to the axis X—X, and crosses at diametrally opposite points a true circumference, indicated by the dotted line Y, of the shaft surface.

The sealing band formed by the sealing edge 6 therefore has two incompletely circumferential zones, at either side of the circumference Y, and around these zones those grooves 13 which are intercepted obliquely by the sealing edge 6 form vane surfaces 14 which meet the sealing edge at a point 5 at each end.

When the seal is in use, lubricating oil, or other fluid, is present at the inner side of the seal, which is the left-hand side as seen in FIG. 1, and tends to leak along the shaft surface past the sealing edge 6. Such fluid encounters the vane surfaces 14 and it is apparent that, in either direction of shaft rotation, one end portion or the other of each vane surface 14 will impinge relatively obliquely across the path of fluid tending to leak past the sealing edge. The result is that fluid is fed back and leakage is prevented or reduced.

This duo-directional feed-back result is not as yet fully understood and is surprising because it could be expected that opposite ends of the vane surfaces 14 would have equal and opposite effects on the fluid. However, the factors involved in the action of shaft seals are extremely complex and not as yet fully understood and their development is largely empirical.

As mentioned above, FIG. 1 is much exaggerated, a very large angle of obliquity of the inner face 8 and sealing edge 6 being shown for the purpose of illustration.

In practice, a small angle of obliquity only is required, for example as little as 1° with fine, closely spaced grooves 13, and FIG. 2 is a more realistic illustration of an acutal seal with two of the vane surfaces 14 meeting the sealing edge 6 at points 15. In FIG. 2, the section is taken at 90° to that of FIG. 1 and the other ends of the two vane surfaces 14 meet the sealing edge 6 in the other half of the seal (not shown) at points corresponding to the points 15.

In the seal of FIG. 3, the lip-flange 4 is moulded so that it is circular about a slightly oblique axis Z—Z, i.e. it is a skewed flange, the grooves 13 are moulded as right circular grooves about the seal axis X—X and the frustoconical inner surface 8 is knifed about the oblique axis Z—Z to form a sealing edge 6 which is slightly oblique to the seal axis X—X. The sealing edge 6 in this case could be circular about the oblique axis Z—Z. The sealing edge thus forms a sealing band with two incompletely circumferential zones having vane surfaces 14 meeting the sealing edge 6 at points 15 similar to those of FIGS. 2 and 3.

In the different kind of lip-type seal shown by FIG. 4, the lip-flange 4 and the right circular grooves 13 moulded in the frustoconical outer surface 11 are coaxial with the seal axis X—X but the plane inner face 10 is knifed slightly obliquely to the axis X—X so that the sealing edge 9 is slightly elliptical, oblique to the axis X—X and forms a sealing band with an incompletely circumferential zone around which vane surfaces 14 extend to meet the sealing edge 9 at points 15.

The seals illustrated have been shown with moulded grooves for the purpose of illustration and it will be understood that corresponding ridges could be moulded. In fact, in a frustoconical surface, it is preferred to mould circular steps, which can be regarded as either grooves or ridges, each step having one cylindrical face and one transversely radial face which facilitates separation of a moulding axially from a die.

Also, the dimensions of the ridges, grooves or steps need be only very small. For example in a stepped frustoconical moulding for a lip-type seal for a shaft having a diameter of 3 inches (7.62 cm.), the steps may each have a radial depth of 0.005 inch (0.127 mm.) and an axial depth of 0.009 inch (0.22 mm.) with a pitch or spacing equal to 48 per inch (19 per cm.).

The invention has been described and illustrated as applied to an internal shaft seal but it could be applied to an external seal which, as is well known, is mounted on a shaft to rotate therewith and seal against a surrounding cylindrical surface of a housing. In an external seal, the relative positions of the holding portion wall 1 and the flange 4 are inverted and the garter spring 5 acts radially outwardly.

We claim:

1. A shaft seal comprising a moulded sealing ring of resilient material having a peripheral sealing lip, said lip having a peripheral outer frustoconical surface facing away from the fluid-sealing side of the seal and tapering to a continuous elliptical sealing band which lies in a plane transversely slightly oblique to the axis of the ring, said frustoconical surface having therein right circular steps co-axial with the axis of the ring, at least one of said steps being intercepted obliquely by said sealing band and forming a vane member having two ends respectively meeting said sealing band in opposite peripheral directions, said ends of said vane member presenting a pair of oppositely-directed flank surfaces progressively joining said sealing band, and said pair of flank surfaces being operative as vane surfaces, for one direction and the other respectively of relative shaft rotation when the seal is in use, to sweep back to the sealing band fluid leaking past said sealing band.

2. A shaft seal according to claim 1, in which said lip is co-axial with said ring so that said sealing band is slightly oblique to the axis of said lip as well as to the axis of said ring.

3. A shaft seal according to claim 2, in which said lip has a peripheral inner frustoconical surface, facing towards the fluid-sealing side of the seal, and said outer and inner frusto-conical surfaces are mutually convergent and define said sealing band by their convergence.

4. A shaft seal according to claim 1, in which the axis of said lip and the plane of said sealing band are both slightly oblique to the axis of said ring.

5. A shaft seal according to claim 4, in which said lip has a peripheral inner frustoconical surface, facing towards the fluid-sealing side of the seal, and said outer and inner frustoconical surfaces are mutually convergent and define said sealing band by their convergence.

6. A shaft seal according to claim 1, in which said lip has a plane inner face, facing towards the fluid-sealing side of the seal, said inner face being slightly oblique to the axis of said ring and defining said sealing band at the junction of said inner face and said outer frustoconical surface.

7. A shaft seal according to claim 1, in which said steps are of L-section with one flank surface substantially cylindrical about the axis of said ring.

References Cited

UNITED STATES PATENTS

| 1,811,588 | 6/1931 | Moreau | 277—134 |
| 2,446,380 | 8/1948 | Meyers et al. | 277—134 X |
| 3,376,045 | 4/1968 | Jagger | 277—134 |

FOREIGN PATENTS

| 673,726 | 6/1952 | Great Britain. |
| 996,711 | 6/1965 | Great Britain. |
| 611,018 | 10/1960 | Italy. |
| 1,342,278 | 9/1963 | France. |
| 1,468,256 | 12/1966 | France. |

SAMUEL ROTHBERG, Primary Examiner